April 10, 1945.   C. L. ROYAL   2,373,342
MANUFACTURE OF GLUTAMIC ACID
Filed Sept. 6, 1943
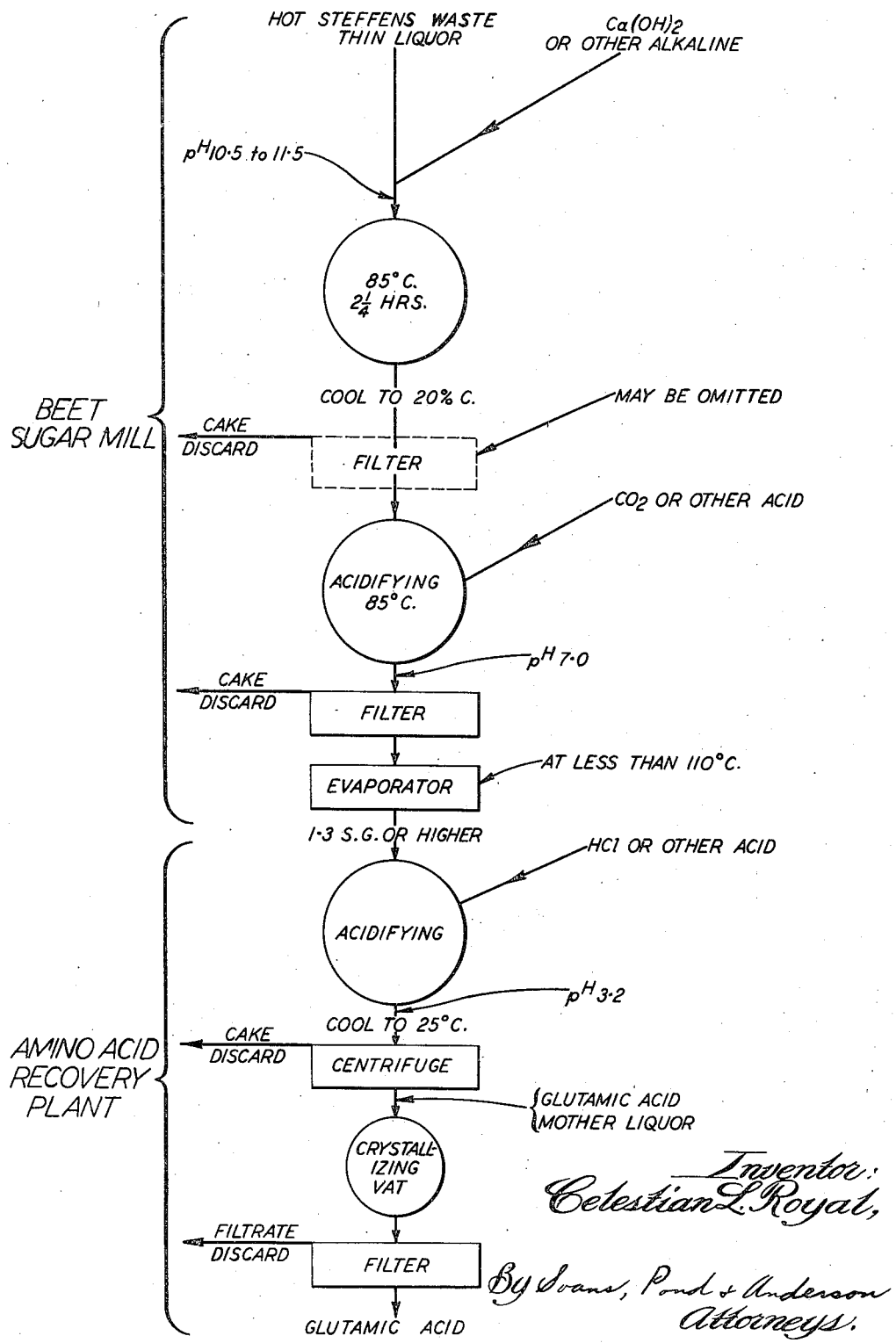

UNITED STATES PATENT OFFICE 2,373,342

MANUFACTURE OF GLUTAMIC ACID

Celestian L. Royal, Toledo, Ohio, assignor to International Minerals & Chemical Corporation, a corporation of New York Application September 6, 1943, Serial No. 501,356

3 Claims. (Cl. 260—527)

This invention relates to improvements in the manufacture of glutamic acid and is of particular value in connection with the recovery of the glumatic acid which is contained in Steffen's waste liquor (the liquor which remains as the end product to be discarded at the conclusion of the well-known Steffen's process for the recovery of sugar from the molasses or sirup remaining from one of the later stages of the usual process for manufacturing sugar from the sugar beet). This invention is to a certain extent a substitute for, or an improvement upon, the process described in the Masuda et al. patent, No. 1,947,563, issued February 20, 1934, and has certain advantages over the procedure set forth in said patent.

As Steffen's waste water or liquor comes from the sugar beet factory, it is what is known as thin Steffen's waste, having a water content of about 97%. The materials other than water are about .1% sugar and .35% alkaline material, for example KOH, NaOH, Ca(OH)$_2$ and about 2.55% of protein materials, principally glutamic acid, with much smaller amounts of other substances, including tyrosine, isoleucine, leucine, and betaine.

The purpose of the present invention is to recover the glutamic acid contained in thin Steffen's waste liquor.

The first step in the improved process is to add to the thin Steffen's waste liquor sufficient lime in the form of the oxide or the hydroxide to bring the pH of the Steffen's waste liquor up to about from 10.5 to 11.5. The alkalinized liquor is then heated to a temperature sufficiently high for a sufficient length of time to effect necessary hydrolyzation or breaking down of the various proteiniferous constituents. Usually, it is sufficient to hold the temperature of the alkalinized material preferably at 85° C. for about two and one-quarter hours.

The hydrolyzed liquor is then cooled to about 20° C. preferably, to permit certain of the unwanted constituents to crystallize out and these unwanted constituents may be separated by a filtration step, the solids being discarded. In certain cases this cooling and filtration step to remove a portion of the undesired materials may be omitted.

In any case, the hydrolyzed liquor is then neutralized. This neutralization of the hydrolyzed waste liquor may be effected in various ways, for example, by treating with various acid substances, such as carbon dioxide, phosphoric acid, or possibly sulfuric acid. This carbonating step is effected in any desired type of mixing tank with a rapidly moving agitator, the carbonating being effected preferably at a temperature of about 85° C. The treatment of the liquor with carbon dioxide serves to neutralize the alkalinity of the hydrolyzed waste liquor, the carbonates which are formed being relatively insoluble. These insoluble carbonates and any other insoluble materials or precipitated materials which have been formed in any previous step of the process and are contained in the neutralized waste liquor, may be separated in any desired type of filtration apparatus, and the solid matter is discarded. At this point the filtrate which contains the glutamic acid in solution is still mostly water containing a relatively low percentage of glutamic acid.

The amount of Steffen's waste liquor which is available in any area is limited by the capacity of the local beet sugar factory or factories in that area to produce this so-called waste material, but it is not economical to operate separate plants for the purpose of recovering glutamic acid from the limit amount of waste liquor produced in the various areas where the beet sugar factories are located. Hence, it is usually considered advantageous to establish a single large plant for the purpose of treating Steffen's waste liquor produced by different beet sugar factories located in a group of widely spaced areas and collectively producing a sufficient amount of Steffen's waste liquor to make the glutamic acid recovery operation economically feasible. Hence, in collecting the liquor at the point where the glutamic acid recovery is actually effected, it is desirable that the Steffen's waste liquor be shipped and received in as concentrated a condition as possible; otherwise the freight charges would be prohibitive.

To this end, therefore, the neutralized and filtered thin liquor is concentrated to a specific gravity of approximately 1.3 or somewhat higher by means of a multi-effect evaporator, the operation preferably being performed at a temperature of not more than about 110° C. in the first effect.

The concentrated glutamic acid liquor is shipped to the main glutamic acid plant and stored until it is ready to be processed further. Since it is in a neutralized condition, having a pH of about 7.0, it is not necessary to take any particular precautions about the materials which are used in constructing the tanks or piping involved at this stage in the storage or handling of the concentrated liquor.

The next step in the further processing of liquor consists in introducing a batch into an acidifying tank or vat and to the batch there is added at this point a sufficient supply of hydrochloric acid or other appropriate acid such as sulfuric acid to bring the pH value of the liquor down to about 3.2, which is the iso-electric point of glutamic acid. This acidifying step is effected at a temperature not to exceed 50° C.

The mother liquor resulting from the previous or final acidification step is then filtered or centrifuged, preferably at 50° C., to remove the inorganic salts which crystallized out during acidification. The filtrate or liquid coming from the centrifuge is then introduced into a large crystallizing vat, where it is allowed to stand at room temperature for a sufficient length of time, usually about a week, to enable the crude glutamic acid to crystallize. The resulting slurry is then removed from the crystallizing vat and treated in a filter, for example, of the filter-press type, and the filtrate is discarded; or if it contains any substantial percentage of glutamic acid it may be recirculated through the system to salvage the residual acid.

The cake from the filtrate consists of somewhat impure glutamic acid crystals, which, if desired, may be further treated in any approved manner in order to remove impurities and improve the color. Usually, this further purification step involves treatment with caustic soda in order to produce mono sodium glutamate, which is the commercial form in which glutamic acid is usually sold.

In the drawing accompanying this application there is shown a flow sheet disclosing the preferred procedure as above described.

The details herein described are illustrative of the preferred way in which I have heretofore successfully practiced the improved process. It will be understood that the process is capable of such variations as may be found within the scope of the appended claims.

I claim:

1. The improvement in the art of recovering glutamic acid from thin Steffen's waste liquor, which comprises adding to the waste liquor sufficient alkaline material to raise the pH to from 10.5 to 11.5, heating the liquor for a time and at a temperature sufficient to hydrolyze the proteiniferous constituents, then reducing the pH to about the neutral point of 7.0 by the addition of an acidic material, separating and discarding any solids present, evaporating sufficient water to raise the specific gravity to about 1.3, adding to the liquor sufficient acidic material to reduce the pH to about the iso-electric point of glutamic acid and permit the inorganic salts to crystallize, separating and removing the solid materials, holding the liquor at about room temperature or less for a sufficient length of time to permit the glutamic acid to crystallize and then separating the glutamic acid crystals from the liquor.

2. The improvement in the art of recovering glutamic acid from thin Steffen's waste liquor, which comprises adding to the waste liquor sufficient alkaline material to raise the pH to from 10.5 to 11.5, heating the liquor for a time and at a temperature equivalent to about two hours at 85° C. so as to hydrolyze the proteiniferous constituents, then reducing the pH to about the neutral point of 7.0 by the addition of an acidic material, separating and discarding any solids present, evaporating sufficient water to raise the specific gravity to about 1.3, adding to the liquor sufficient acidic material to reduce the pH to about the iso-electric point of glutamic acid and permit the inorganic salts to crystallize, separating and removing the solid materials, holding the liquor at about room temperature or less for a sufficient length of time to permit the glutamic acid to crystallize and then separating the glutamic acid crystals from the liquor.

3. The improvement in the art of recovering glutamic acid from thin Steffen's waste liquor, which comprises adding to the waste liquor sufficient calcium hydroxide to raise the pH to from 10.5 to 11.5, heating the liquor for a time and at a temperature equivalent to about two hours at 85° C. so as to hydrolyze the proteiniferous constituents, then reducing the pH to about the neutral point of 7.0 by the addition of carbon dioxide, separating and discarding any solids present, evaporating sufficient water to raise the specific gravity to about 1.3, adding to the liquor sufficient hydrochloric acid to reduce the pH to about the iso-electric point of glutamic acid and permit the inorganic salts to crystallize, separating and removing the solid materials, holding the liquor at about room temperature or less for a sufficient length of time to permit the glutamic acid to crystallize and then separating the glutamic acid crystals from the liquor.

CELESTIAN L. ROYAL.